United States Patent [19]

Jungkman et al.

[11] Patent Number: 5,017,786
[45] Date of Patent: May 21, 1991

[54] $V_2O_3$ PROTECTION FOR IR DETECTOR ARRAYS AGAINST INTENSE THERMAL RADIATION

[75] Inventors: David L. Jungkman, Hudson, N.H.; Timothy E. White, Acton, Mass.

[73] Assignee: Honeywell Inc., Minneapolis, Minn.

[21] Appl. No.: 452,753

[22] Filed: Dec. 19, 1989

[51] Int. Cl.$^5$ .............................................. G01J 5/06
[52] U.S. Cl. .................... 250/352; 250/332; 250/349; 250/370.13; 250/370.15
[58] Field of Search ............... 250/352, 349, 353, 332, 250/370.13, 370.15; 350/353

[56] References Cited

U.S. PATENT DOCUMENTS

| | | | |
|---|---|---|---|
| 4,169,273 | 9/1979 | Hendrickson | 250/211 |
| 4,283,113 | 8/1981 | Eden | 350/96.15 |
| 4,487,037 | 12/1984 | Meignin et al. | 250/352 |
| 4,577,098 | 3/1986 | Ogawa | 250/370.13 |
| 4,914,299 | 4/1990 | Jungkman | 250/370.15 |

OTHER PUBLICATIONS

Pawlikowski & Becla, Some Properties of Photovoltaic CdHgTe Detectors for Infrared Radiation, 1/8/1975.

Primary Examiner—Carolyn E. Fields
Assistant Examiner—James Beyer
Attorney, Agent, or Firm—Haugen and Nikolai

[57] ABSTRACT

Apparatus in a thermal radiation detection device including optics having a focal plane comprising a cold mounting surface, a detector array, a standoff and apparatus for protecting the detectors from intense thermal radiation. The detector array includes a plurality of radiation sensitive detectors mounted on a carrier in thermal contact with the cold mounting surface. The standoff defines a cold platform proximate to the detector array and mounted to the cold mounting surface. A substrate includes a film of vanadium trioxide on a first surface, wherein the substrate is mounted to the standoff at the first surface and wherein the substrate is structured and arranged to interpose the vanadium trioxide film between the detector array and a radiation source and is located proximate the focal plane. The vanadium trioxide film has a transition temperature above which it becomes reflective of the source radiation and the cold platform is maintained at a temperature below the transition temperature in the absence of intense external radiation impinging on the film.

17 Claims, 1 Drawing Sheet

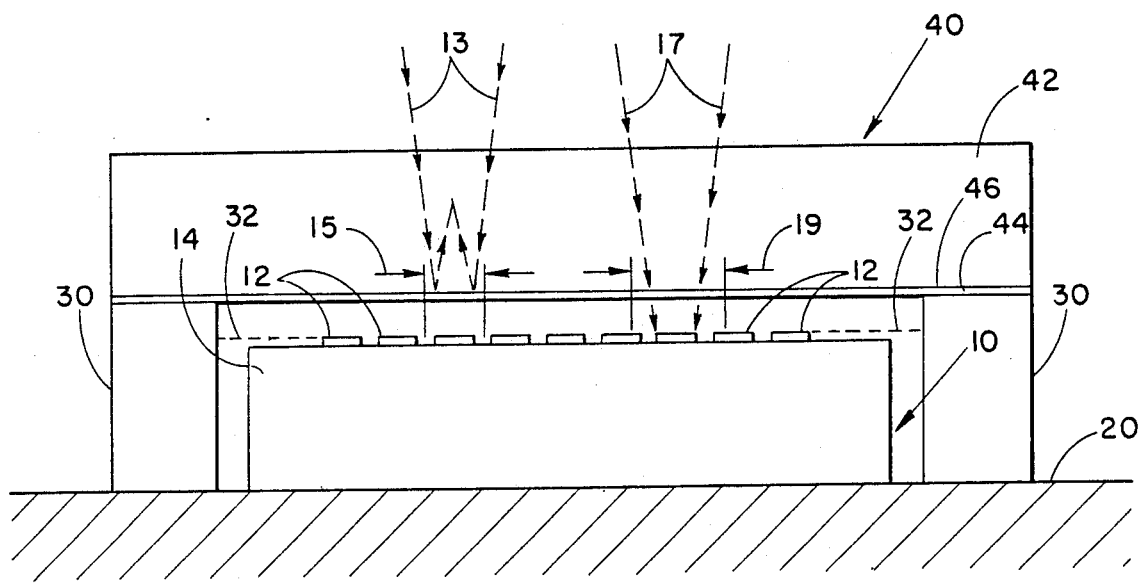

$V_2O_3$ PROTECTION FOR IR DETECTOR ARRAYS AGAINST INTENSE THERMAL RADIATION

BACKGROUND OF THE INVENTION

This invention relates to thermal radiation detection devices and, in particular, to an improved apparatus for detecting infrared radiation including a protective film such as vanadium trioxide for protecting a detector array against excessive amounts of thermal radiation.

Infrared photo detectors are operated at low temperatures in order to obtain improved detector performance The detectors are typically mounted in a double flask of the Dewar type such as disclosed in U.S. Pat. No. 4,206,354 to Small, Jr., the teachings of which are incorporated herein by reference. The infrared detectors are typically mounted in thermal contact with the top surface of an inner flask, for example, which is cryogenically cooled in order to allow the detector array to operate at cryogenic temperatures. Detector arrays are typically comprised of material such as HgCdTe, and other radiation sensitive materials. In a typical detection system, system optics focus radiation through a transmitting window which may be typically germanium, for example, and onto the detector array. In prior art systems, no provision is made for protecting the detector array from excessively high amounts of thermal radiation, as may be produced by a coherent, collimated light source.

Vanadium trioxide ($V_2O_3$) is a material that is transparent in the long wave infrared (LWIR) spectrum until it reaches a transition temperature of about 150° K. At such transition temperatures, it becomes reflective. The present invention takes advantage of this property by placing a film of $V_2O_3$ on a transmissive element in an LWIR detector system. The film is located very near a detector array in an infrared detection apparatus. In accordance with the present invention, such a $V_2O_3$ coated transmissive element or substrate provides hardening against interference from intense light sources and damage from such light sources. Further, the present invention provides for locating the protective film proximate to the detectors near the focus of the system optics so as to localize the area so protected and allow the other detectors to receive more normal thermal radiation signals. As an intense amount of radiation is presented to the detector, the $V_2O_3$ film is heated by the radiation above its threshold temperature and becomes reflective, thereby reflecting the intense thermal radiation away from the detector array. Because the $V_2O_3$ film is nearly in focus, only the exact area being exposed to the intense thermal radiation is switched. The rest of the detector array is still operable to receive radiation coming from other sources.

SUMMARY OF THE INVENTION

An apparatus in a thermal radiation detection device including optics having a focal plane is disclosed. The apparatus comprises a cold mounting surface, a detector array, standoff means, and means for protecting the detectors from intense thermal radiation. The detector array includes a plurality of radiation sensitive detectors mounted on a first carrier which is in thermal contact with the cold mounting surface. The standoff means defines a cold platform proximate to the detector array and is mounted to the cold mounting surface. The protection means comprises a substrate which includes a protective film comprising material such as vanadium trioxide on a first surface, wherein the substrate is mounted to the cold platform means at the first surface and wherein the substrate is structured and arranged to interpose the vanadium trioxide or other protective film proximate the focal plane between the detector array and a radiation source. The vanadium trioxide film has a transition temperature above which it becomes reflective of the source radiation and the cold platform means is maintained at a temperature below the transition temperature thereby cooling the protective film to that temperature in the absence of external radiation striking the film.

In the preferred embodiment of the invention, the cold platform means comprises thermal standoffs substantially comprised of material selected to provide the appropriate thermal conductivity so that the cold platform preferably provides a mounting surface at a temperature below 150° K. for a vanadium trioxide coated substrate. The cold mounting surface is preferably arranged to maintain the detector array at a temperature in the range of about 40° K. to about 100° K.

Other objects, features and advantages of the invention will become apparent to those skilled in the art through the description, claims and drawing herein.

BRIEF DESCRIPTION OF THE DRAWING

The sole figure schematically shows one embodiment of the infrared detection apparatus of the invention including a protective film proximate the detector array.

DESCRIPTION OF THE PREFERRED EMBODIMENT

Referring to the sole figure, one embodiment of the thermal protection apparatus of the invention is shown. The apparatus comprises a detector array 10, a cold mounting surface 20, a means for defining a cold platform 30, and a transmissive substrate 40. The detector array includes a plurality of thermal radiation detectors 12 mounted on a carrier 14 comprising HgCdTe or other materials known in the art as suitable for fabricating detector arrays in a well-known manner. The detector array may be connected in a well-known manner to processing electronics such as multiplexer electronics embodied in a semiconductor chip for processing electrical signals from the array into data representing the radiation received by the detectors. In order to highlight the features of the invention, these external electronics and connections thereto have not been shown since they are well-known in the art.

The detector array 10 is mounted to cold mounting surface 20 which may be the top surface of a cold finger device, for example, as is well understood. The cold mounting surface 20 is cryogenically cooled by conventional cooling means (not shown) so as to maintain the detector array at a temperature in the range of about 40° K. to about 100° K. The transmissive substrate 40 is further comprised of a first body 42 and a film 44, preferably of vanadium trioxide. For effective protection the vanadium trioxide film requires a thickness of less than 10 microns. The surface area of each detector may be as is typically found in the art, for example, a square 50 microns on a side.

The standoff means 30 define a cold platform proximate to the detector array upon which the transmissive substrate 40 is mounted. The vanadium oxide film is applied to a first surface 46 of the first body 42. The substrate 40 is mounted with the vanadium trioxide film very near the plane denoted by the broken line 32 wherein the plane is defined by the top surfaces of the detectors 12. The cold platform means 30 may be comprised of a thermal standoff made substantially of materials with moderate thermal conductive properties, and located at a distance from the cold mounting surface and conventionally designed so as to maintain the vanadium trioxide film at a temperature below its transition temperature in the absence of intense external thermal radiation. In the preferred embodiment of the invention, the cold platform maintains the vanadium trioxide film at a temperature of about 145° K.

The cold platform may be advantageously made substantially of brass or aluminum oxide ceramic, for example. When intense thermal radiation is presented to the film as indicated by broken lines 13, it heats the vanadium trioxide film at the point of impact shown, for example, as area 15, above the threshold temperature thereby causing the radiation 13 to be reflected away from the detector array at the point of impact. Such intense thermal radiation signals may emanate from a light source directed at the detection device. Normal thermal radiation signals, indicated as broken lines 17, are not intense enough to raise the vanadium trioxide film at location 19 above the threshold temperature and so continue on to strike the detector 12, at that location. Normal signals typically may emanate from buildings, vehicles and geographic features which come into the field of view of the detection device. Thus, areas of the detector apparatus which receive highly intense amounts of thermal radiation will reflect the radiation back out of the system, whereas those portions receiving normal amounts of radiation will continue to operate.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. Apparatus in a thermal radiation detection device including optics having a focal plane comprising:
   (a) a cold mounting surface;
   (b) a detector array including a plurality of radiation sensitive detectors mounted on a carrier which is in thermal contact with the cold mounting surface;
   (c) means for defining a cold platform means proximate to the detector array and mounted to the cold mounting surface; and
   (d) a substrate including a film of vanadium trioxide on a first surface, wherein the substrate is mounted to the cold platform means at the first surface and wherein the substrate is structured and arranged to interpose the vanadium trioxide film proximate to the focal plane between the detector array and the radiation source plane, wherein the vanadium trioxide film has a transition temperature above which it becomes reflective and the cold platform means is structured and arranged at a distance from the cold mounting surface to be maintained at a temperature below the transition temperature and so as to maintain the vanadium trioxide film below its transition temperature in the absence of excessive external radiation striking the film.

2. The apparatus of claim 1 wherein the cold platform means comprises a thermal standoff substantially comprised of material selected from the group consisting of brass and aluminum oxide ceramic.

3. The apparatus of claim 2 wherein the cold platform means provides a mounting surface at a temperature below about 150° K.

4. The apparatus of claim 1 wherein the cold platform means provides a mounting surface maintained at a temperature below about 150° K.

5. The apparatus of claim 1 wherein the detectors are infrared detector cells.

6. The apparatus of claim 5 wherein the infrared detector cells consist substantially of HgCdTe.

7. The apparatus of claim 5 wherein the cold mounting surface is arranged to maintain the detector array at a temperature in the range of about 40° K. to about 100° K.

8. The apparatus of claim 1 wherein the cold mounting surface is arranged to maintain the detector array at a temperature in the range of about 40° K. to about 100° K.

9. Apparatus in a thermal radiation detection device including optics having a focal plane comprising:
   (a) a cold mounting surface;
   (b) a detector array including a plurality of radiation sensitive detectors mounted on a carrier in thermal contact with the cold mounting surface;
   (c) means for defining a cold platform means proximate to the detector array and mounted to the cold mounting surface;
   (d) a substrate including a transmissive body having a protective film of a thermally reactive material applied to a first surface, wherein the substrate is mounted to the cold platform means at the first surface, wherein the substrate is structured and arranged to interpose the protective film proximate to the focal plane between the detector array and the radiation source, wherein the protective film has a transition temperature above which it becomes reflective and the cold platform means maintains a temperature at the protective film below the transition temperature so as to only block intense thermal radiation impinging on the film when the temperature of the protective film is raised above the transition temperature by the intense thermal radiation.

10. The apparatus of claim 9 wherein the protective film consists substantially of vanadium trioxide.

11. The apparatus of claim 9 wherein the cold platform means comprises a thermal standoff consists substantially of material selected from the group consisting, of brass and aluminum oxide ceramic.

12. The apparatus of claim 11 wherein the cold platform means provides a mounting surface at a temperature below about 150° K.

13. The apparatus of claim 9 wherein the cold platform means provides a mounting surface maintained at a temperature below about 150° K.

14. The apparatus of claim 9 wherein the detectors are infrared detector cells.

15. The apparatus of claim 14 wherein the infrared detector cells consist substantially of HgCdTe.

16. The apparatus of claim 15 wherein the cold mounting surface is arranged to maintain the detector array at a temperature in the range of about 40° K. to about 100° K.

17. The apparatus of claim 9 wherein the cold mounting surface is arranged to maintain the detector array at a temperature in the range of about 40° K. to about 100° K.

* * * * *